UNITED STATES PATENT OFFICE.

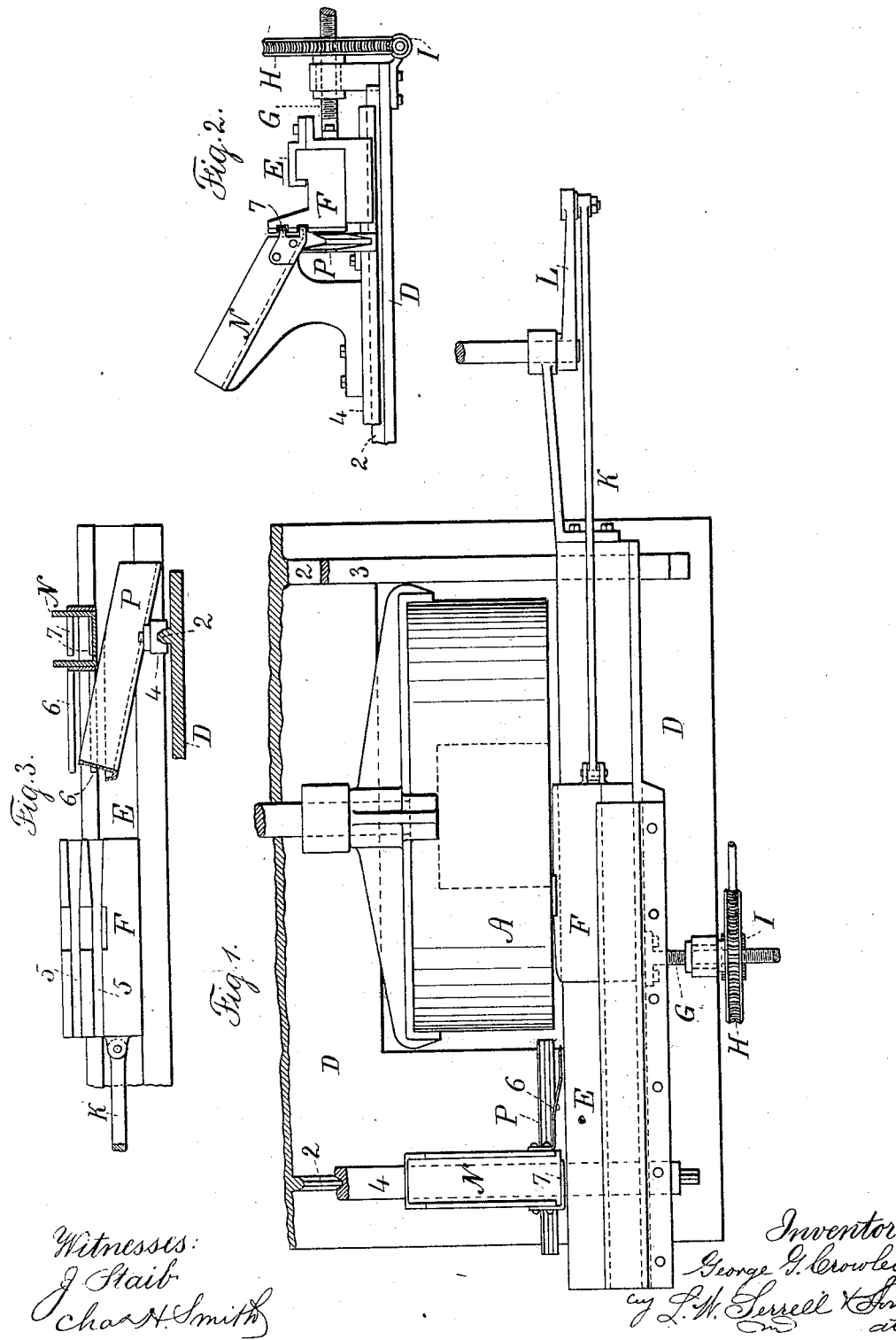

GEORGE G. CROWLEY, OF POUGHKEEPSIE, NEW YORK.

GRINDING-MACHINE.

SPECIFICATION forming part of Letters Patent No. 611,835, dated October 4, 1898.

Application filed December 1, 1897. Serial No. 660,338. (No model.)

*To all whom it may concern:*

Be it known that I, GEORGE G. CROWLEY, a citizen of the United States, residing at Poughkeepsie, in the county of Dutchess and State of New York, have invented an Improvement in Grinding-Machines, of which the following is a specification.

In the manufacture of cutter-bars for mowing and reaping machines the cutters are usually riveted upon a bar, and under the cutters are finger-plates riveted upon the fingers or guards. In the manufacture of the cutters and the finger-plates it is generally advantageous to grind off the flat surfaces of the cutters and finger-plates, so that they may run freely upon each other and present a keen edge to the material to be cut. The present improvement is especially designed for grinding or slabbing off the flat surfaces of these cutters or plates, and to effect this operation a stone is provided with a flat side face, and the plates to be ground are supplied from a hopper and taken off one by one into a recess in a reciprocating carriage and by it carried across the face of the grinder and back again, and in the surface of the reciprocating carriage are grooves, and stationary spring-fingers are provided, preferably supported at one side of the hopper, and these fingers enter the grooves and discharge the ground plate, which falls into a trough or receptacle, and at the other side of the hopper or chute fingers are provided that prevent the plates in the trough or hopper from dropping out when the end of the carriage passes by the end of the chute, and the carriage is supported by and reciprocated in a slide-rest that is adjusted progressively, and preferably automatically, toward the grinder as the surface thereof is worn away, so that the grinding operations may be rendered uniform.

In the drawings, Figure 1 is a plan view of the present improvement. Fig. 2 is an elevation endwise of the carriage, and Fig. 3 represents the face of the carriage detached and the chute in section.

The grinder A is preferably a stone supported by arms from the revolving shaft that is sustained in suitable bearings upon a bed-plate D, and it is advantageous to make this stone with a central recess or opening, so that the entire surface may be used in the grinding operation, and thereby insure uniformity in the wear upon the surface of the stone.

Upon the bed-plate D there are slideways 2, that support the slide-rest E, having slides 3 and 4 upon the ways 2, and a screw G is employed for moving the slide-rest from time to time or progressively toward the surface of the grinder A as such grinder wears away, and I prefer to employ a nut, with a wheel H upon it, surrounding the screw, and which wheel H is turned progressively by a worm-pinion I or similar device actuated progressively and sufficiently slowly to set up the slide-rest as the surface of the stone is worn away. Upon this slide-rest is the carriage F, that is reciprocated by suitable means—such as a connecting rod K and crank L, revolved by suitable power—and the throw of the crank is to be sufficient for giving the necessary motion to the reciprocating carriage to bring the article that is to be ground from the supply-chute N across the grinding-surface of the stone, between the edge thereof and the central recess, and to carry such article back again for delivery, as hereinafter mentioned.

The chute N is supported upon the slide 4, and it is of a size and shape adapted to receive the article to be surfaced or ground, and the carriage F is supported in the slide-rest E in any suitable manner, so that it is held from lateral motion or vibration, but it is free to be reciprocated endwise.

In the surface of the carriage F, opposite the face of the grinder, are grooves 5. I prefer to use two grooves, but any suitable number may be employed, and upon the chute N are spring-fingers 6, entering these grooves and extending from the chute toward the grinder, and there are other fingers 7 attached to the opposite edge of the chute and extending partially across the end of such chute. These fingers 7 may be rigid, and in the surface of the reciprocating carriage is a recess adapted to receive the article to be ground, and this recess may be of the same shape as the article, so that the article will fit into the recess, or there may be a bottom and two vertical sides to the recess, so that the plate to be ground will rest upon the ledge at the bottom of the recess and be carried across the surface of the grinder and back again, and beneath the lower end of the chute and closely adjacent to the surface of the carriage is a discharge-trough P at a sufficient inclination for the article ground to slide down the same.

The operation of this machine is as follows: The blanks to be ground are supplied into the chute N and slide down the same and rest against the surface of the reciprocating carriage, and as such carriage moves along the lower plate in the chute is carried off by the carriage and beneath the fingers 6, which yield as the plate is moved behind such fingers and upon the surface of the carriage, and these fingers guide the plate until the advancing end of the plate passes in between the carriage and the grinder, and the grinding operation is performed as the plate is carried across the surface of the grinder and back again, and when the plate passes clear of the edge of the grinder the fingers 6 insure the discharge of such plate and the dropping of the same into the trough P. If the reciprocation of the carriage F is sufficient to cause the back end thereof to pass beyond the end of the chute N, the fingers 7 prevent the plates in the chute sliding down and falling away. These fingers 7 are not necessary in cases where the surface of the reciprocating carriage does not move sufficiently far to allow the plates to drop away, such carriage being longer than that shown in the drawings.

I claim as my invention—

1. The combination with a revolving grinder, of a slide-rest and means for adjusting the same gradually toward the grinder, a carriage upon the slide-rest and firmly supported thereby, means for reciprocating the carriage endwise, a supply-chute for the articles to be ground, the face of the carriage being recessed for the reception of such articles and a spring-finger for holding the article as it is moved by the carriage from the chute to the grinder and for discharging the article after it has been ground, substantially as set forth.

2. In combination with the revolving grinder and the slide-rest, a carriage firmly supported by the slide-rest, means for reciprocating the carriage endwise, the surface of the carriage being grooved longitudinally and recessed for the reception of the article to be ground, a chute for supplying the articles, a spring-finger and a stationary support for the same and acting to hold the article in the recess of the carriage as it is moved to the grinder and for discharging the article after being ground, and a trough into which such article falls, substantially as set forth.

3. In combination with the revolving grinder and the slide-rest, a carriage firmly supported by the slide-rest, means for reciprocating the carriage endwise, the surface of the carriage being grooved longitudinally and recessed for the reception of the article to be ground, a chute for supplying the articles, a spring-finger acting to hold the article in the recess of the carriage as it is moved to the grinder and for discharging the article after being ground, and a trough into which such article falls, a finger at the other side of the chute for preventing articles dropping from such chute when the reciprocating carriage passes by the end thereof, substantially as specified.

4. In combination with the revolving grinder and the slide-rest, a carriage firmly supported by the slide-rest, a crank and connecting-rod for reciprocating the carriage endwise, the surface of the carriage being grooved longitudinally and recessed for the reception of the article to be ground, a chute for supplying the articles, a spring-finger acting to hold the article in the recess of the carriage as it is moved to the grinder and for discharging the article after being ground, substantially as set forth.

Signed by me this 26th day of November, 1897.

GEO. G. CROWLEY.

Witnesses:
P. EDGAR ACKERT,
ANNIE M. JACKSON.